US009746917B2

(12) United States Patent
Yu et al.

(10) Patent No.: US 9,746,917 B2
(45) Date of Patent: Aug. 29, 2017

(54) ROTATION OF VISUAL CONTENT ON A DISPLAY UNIT

(71) Applicant: Tobii Technology AB, Danderyd (SE)

(72) Inventors: Aron Yu, Stockholm (SE); Marten Skogo, Danderyd (SE); Robert Gavelin, Akersberga (SE); Per Nystedt, Akersberga (SE)

(73) Assignee: TOBII AB, Danderyd (SE)

( * ) Notice: Subject to any disclaimer, the term of this patent is extended or adjusted under 35 U.S.C. 154(b) by 0 days.

(21) Appl. No.: 14/103,336

(22) Filed: Dec. 11, 2013

(65) Prior Publication Data
US 2014/0168271 A1      Jun. 19, 2014

(30) Foreign Application Priority Data

Dec. 13, 2012   (EP) ..................... 12196926

(51) Int. Cl.
*G06F 3/01* (2006.01)
*G06T 3/60* (2006.01)
*G06K 9/00* (2006.01)
*G06K 9/32* (2006.01)

(52) U.S. Cl.
CPC ............ *G06F 3/013* (2013.01); *G06F 3/012* (2013.01); *G06K 9/00577* (2013.01); *G06K 9/3233* (2013.01); *G06T 3/60* (2013.01); *G06F 2200/1614* (2013.01)

(58) Field of Classification Search
CPC ............ G02B 27/017; G02B 27/0189; G06F 2200/1614; G06F 3/13; G06F 3/012; G06T 3/60
See application file for complete search history.

(56) References Cited

U.S. PATENT DOCUMENTS

| 5,446,834 A * | 8/1995 | Deering ....................... 345/427 |
| 2004/0157647 A1 | 8/2004 | Takahashi |

(Continued)

FOREIGN PATENT DOCUMENTS

| EP | 2393042 | 7/2011 |
| EP | 2428864 | 3/2012 |
| WO | 2008/116503 | 10/2008 |

OTHER PUBLICATIONS

Fitzmaurice, G.W. et al., An exploration into supporting artwork orientaiton in the user interface, Dec. 1999, p. 1-8.*

(Continued)

*Primary Examiner* — Robert Craddock
(74) *Attorney, Agent, or Firm* — Moore & Van Allen PLLC; W. Kevin Ransom

(57) ABSTRACT

A graphics presentation apparatus including a display unit, an eye-tracking module, and a data output module. The eye-tracking module registers image data representing at least one eye of a user of the apparatus. Furthermore, the eye-tracking module determines, based on the registered image data, an orientation of the at least one eye relative to the display unit. Finally, in response thereto, the eye-tracking module generates a control signal controlling the data output module to produce visual content with such orientation on the display unit that a misalignment between the orientation of said at least one part and the orientation of the at least one eye of the user is minimized.

13 Claims, 3 Drawing Sheets

(56) References Cited

U.S. PATENT DOCUMENTS

| | | |
|---|---|---|
| 2009/0295832 A1* | 12/2009 | Takatsuka .............. G06T 3/40 345/659 |
| 2010/0188328 A1 | 7/2010 | Dodge et al. |
| 2012/0001943 A1 | 1/2012 | Ishidera |
| 2012/0229371 A1 | 9/2012 | Sip |
| 2012/0235790 A1 | 9/2012 | Zhao et al. |

OTHER PUBLICATIONS

Lung-Pan Cheng, Fang-I Hsiao, Yen-Ting Liu, Mike Y. Chen; "IRotate: Automatic Screen Rotation based on Face Orientation"; Session: Phone Fun: Extending Mobile Interaction, CHI 2012, May 5-10, 2012, Austin Texas, USA.
Cheng, Lung-Pan et al.: "iRotate: Automatic Screen Rotation based on Face Orientation", Session: Phone Fun: Extending Mobile Interaction, CHI'12, May 5-10, 2012, Austin, Texas; pp. 2203-2210.

* cited by examiner

ROTATION OF VISUAL CONTENT ON A DISPLAY UNIT

THE BACKGROUND OF THE INVENTION AND PRIOR ART

The present invention relates generally to solutions for presenting visual data to the user of a computing and/or communication apparatus. More particularly the invention relates to an apparatus, method, and computer program product for a graphics presentation apparatus and a method for presenting visual context on a display unit of the graphics presentation apparatus.

Today, the user interaction with a computing and/or communication device can be made fairly flexible and intuitive. For example, there are numerous of solutions that cause the format in which information is displayed to vary depending on how the device is positioned and/or repositioned during the interaction in order to improve the efficiency and usability of a user interface.

US 2010/0188328 describes an environmental gesture recognition system, wherein specific motion patterns are interpreted as commands to a data system. For instance, flipping a portable device backwards may represent a scroll-down command and flipping the device forwards may represent a scroll-up command, while rotating the device clockwise or counter-clockwise around its vertical axis may represent commands for selecting a next and a previous page respectively of a displayed document.

US 2012/0001943 discloses a system, wherein a sensor determines a state of tilt changes of an electronic device. In response to a tilt direction and a tilt angle, the system controls how information is presented on a display unit of the electronic device.

US 2004/0157647 describes a portable device with a display, which is associated with a rotation detection device for detecting the displacement of a housing that stores the display. As a result, when the portable device is rotated 90°, an image shown on the display can be rotated 90° so as to compensate for the rotation of the device.

US 2012/0229371 reveals screen rotation lock methods for preventing an angle-dependent auto rotation of the information that is displayed on the screen of a portable device. Thus, for example, a user can choose to avoid that the screen content is rotated when the device is rotated (e.g. as in US 2012/0001943 or US 2004/0157647).

US 2012/0235790 relates to a solution for locking and unlocking a mobile device using facial recognition. Here, the camera of the device captures images, and a face recognition processor determines whether or not a user is present in front of the device. If not, the device is locked. This function may be triggered in response to the fact that the device has been motionless for a threshold time.

The article Chen, L. P. et al., "*iRotate: Automatic Screen Rotation based on Face Orientation*", Session: Phone Fun: Extending Mobile Interaction, CHI'12, May 5-10, 2012, Austin, Tex., USA, pp 2203-2210 reveals an approach to automatically rotate the screen content on a mobile device to match a user's face orientation. Here, the front camera of the mobile device, such as a mobile phone or tablet, is used to detect the user's face and causes the screen content to rotate accordingly. Thus, in contrast to gravitation-based rotation, the content will be presented correctly also for a user lying down on one side while interacting with the device.

Problems Associated with the Prior Art

Although the above solutions may facilitate the general user interaction with an electronic apparatus, there is still room for improving the visual data presentation. For example the above-mentioned locking and unlocking solution may be annoying to a user because he/she may either forget to activate or deactivate the function, and therefore the visual interface does not behave as expected. Moreover, the solutions that rely on image registration of a user's facial features may fail if the user's face is partially obscured by an object between the device and the user and/or if the device is operated in dim light.

SUMMARY OF THE INVENTION

The object of the present invention is to mitigate the above problems, and thus offer an improved solution for presenting visual content in a user-friendly manner on the display unit of a graphics presentation apparatus.

According to one aspect of the invention, the object is achieved by the initially described graphics presentation apparatus, wherein an eye-tracking module is included, which is configured to register image data representing at least one eye of a user of the apparatus. Based on the registered image data, the eye-tracking module is further configured to determine an orientation of the at least one eye of the user relative to the display unit. In response thereto, the eye-tracking module is configured to generate the control signal so that it controls the data output module to produce the visual content in such a manner that a misalignment between the orientation of at least one part of the visual content and the orientation of the at least one eye of the user is minimized.

This apparatus is advantageous because it provides an intuitive and effortless adaption of a visual user interface to a user's behavior irrespective of whether the physical equipment is repositioned, the user changes his/her posture or if a certain piece of information (e.g. an image or a text section) is retrieved for presentation, which has a default orientation that does not match the current orientation of the user's eyes. Moreover, the proposed apparatus works reliably also if the user's face is partially obscured, or covered, e.g. by a piece of clothing. In fact, it is sufficient if as little as one eye of the user is visible.

According to one preferred embodiment of this aspect of the invention, the data output module is configured to produce the visual content with an orientation relative to the display unit, which orientation may only be varied in predefined angular increments. For example, the increments may represent 90 degree steps, such that the visual content can attain four different orientations on the display unit. Namely, this is very well suited for a rectangular shaped display unit.

According to a further preferred embodiment of this aspect of the invention, the graphics presentation apparatus includes a rotation detection module configured to register an attitude angle of the display unit relative to a frame of reference external to the graphics presentation apparatus, e.g. the Earth's field of gravitation. The data output module is further configured to produce the visual content in such a manner that the visual content is presented with an orientation and a format that depends on the attitude angle of the content relative to the frame of reference. Thereby, in a device where the orientation of the display unit may vary over time (e.g. a portable device), by default the orientation of the visual content may be controlled by the visual content's orientation relative to the external frame of reference. Thus, the eye tracking function can be activated exclusively when it is deemed relevant to perform measurements of the eye orientation.

According to another preferred embodiment of this aspect of the invention, the rotation detection module is configured to generate a trigger signal if the content angle has exceeded a threshold angle relative to the frame of reference during a threshold time. The eye tracking module, in turn, is configured to be activated in response to the trigger signal. Further preferably, the trigger signal is generated exclusively during a predetermined period after that the content threshold angle has been exceeded. Thus, for instance in a portable device, the eye tracking module may be activated only when it is needed, such as in connection with device rotation. Thereby, the energy resources of the device can be economized.

According to still another preferred embodiment of this aspect of the invention, the data output module is configured to maintain a selected orientation in agreement with an orientation in which the visual content was presented on the display unit during a preceding period if the rotation detection module registers a content attitude angle an absolute value of which is less than or equal to an absolute value of a content threshold angle. Preferably, provided that the content is rotated in 90 degrees increments, it is advantageous to set the absolute value of the content threshold angle to a figure slightly above 45 degrees. Namely, thereby, the visual content will continue to have a given orientation also if the apparatus is tilted back and forth somewhat. Such a hysteresis behavior is beneficial because it avoids undesired shifting back and forth of the content orientation if the apparatus is held in an attitude angle approximately around the threshold angle.

According to yet another preferred embodiment of this aspect of the invention, the graphics presentation apparatus is included in a portable electronic device, which, in turn, contains a main body relative to which the display unit has a permanently fixed orientation. Consequently, any rotation of the graphics presentation apparatus as such corresponds to a rotation of the display unit. This facilitates the proposed alignment between the orientation of the visual content and the orientation of the user's eyes.

According to another aspect of the invention, the object is achieved by the method described initially, wherein image data are registered that represent at least one eye of a user of the graphics presentation apparatus. Based on the registered image data, an orientation of the at least one eye of the user relative to the display unit is determined. In response thereto, the control signal is generated so that that the visual content is produced with such orientation of at least one part of the visual content that a misalignment between the orientation of the at least one part and the orientation of the at least one eye of the user is minimized. The advantages of this method, as well as the preferred embodiments thereof, are apparent from the discussion above with reference to the proposed apparatus.

According to a further aspect of the invention the object is achieved by a computer program product, which is loadable into the memory of a computer, and includes software adapted to implement the method proposed above when said computer program product is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
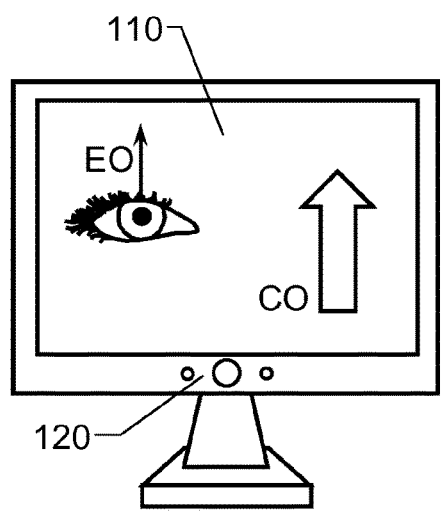
FIG. 1 show examples of how visual content may be rotated on the display unit of a stationary graphics presentation apparatus according to embodiments of the invention.
Figure 2:
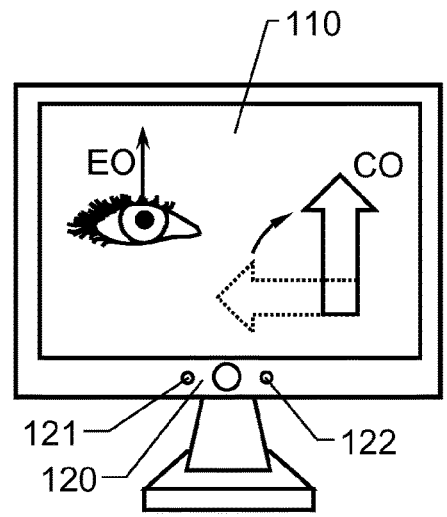
FIG. 2 show examples of how visual content may be rotated on the display unit of a stationary graphics presentation apparatus according to embodiments of the invention.
Figure 10:
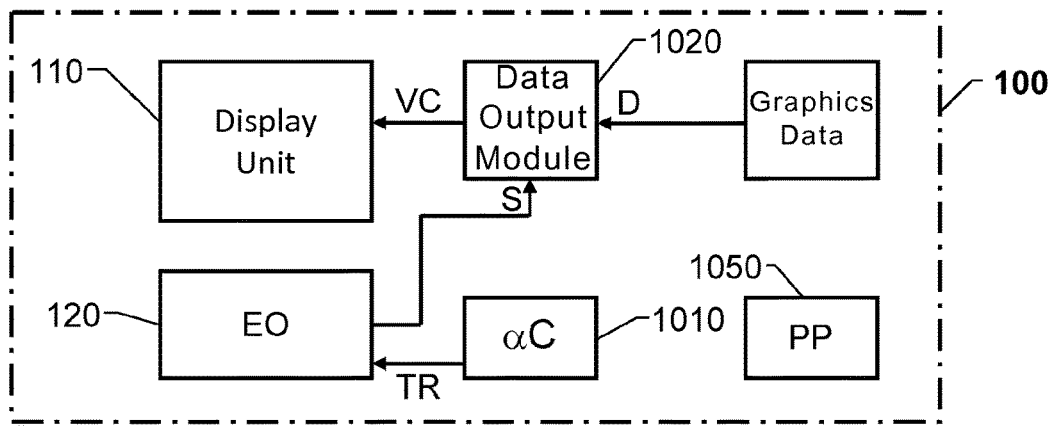
FIG. 10 shows a block diagram of a graphics presentation apparatus according to one embodiment of the invention.

FIGS. 1 and 2 show a display unit 110 included in a stationary graphics presentation apparatus according to one embodiment of the invention. FIG. 10 shows a block diagram of the graphics presentation apparatus 100, as such, according to one embodiment of the invention.

The display unit 110 is configured to present visual content VC to a user. A data output module 1020 in the graphics presentation apparatus 100 is configured to receive graphics data D and a control signal S. In response thereto, the data output module 1020 is configured to produce the visual content VC in such a manner that the visual content VC has a particular orientation CO relative to the display unit 110.

The graphics presentation apparatus also contains an eye-tracking module 120, which in this case, is integrated into the frame of the display unit 110. The eye-tracking module 120 is configured to register image data representing at least one eye of a user of the graphics presentation apparatus 100. To enhance the image registering capability, the eye-tracking module 120 may include one or more illuminators, 121 and 122, for example configured to emit near infrared (NIR) light towards a user of the graphics presentation apparatus. Based on the registered image data, the eye-tracking module 120 is configured to determine an orientation EO of the at least one eye of the user relative to the display unit 110. In response thereto, the eye-tracking module 120 is configured to generate the control signal S so that it controls the data output module 1020 to produce the visual content VC with such orientation CO that a misalignment between the orientation CO of the visual content VC and the orientation EO of the at least one eye of the user is minimized.

In FIG. 1, the visual content VC already has an orientation CO essentially matching the orientation EO of the at least one eye upon retrieval, and therefore no adjustment of the orientation CO is necessary. However, FIG. 2 illustrates a situation where the visual content VC is retrieved with a default orientation directed horizontally to the left, whereas the orientation EO of the at least one eye of the user is directed +90° thereto, i.e. upwards. Consequently, the eye-tracking module 120 generates the control signal S so that it controls the data output module 1020 to produce the visual content VC with an orientation CO that is rotated +90° in relation to the default orientation. Thus, the orientation CO of the visual content VC automatically becomes aligned as much as possible with the orientation EO of the at least one eye. This, of course, enhances the user-experience of the visual content VC.

Figure 3:
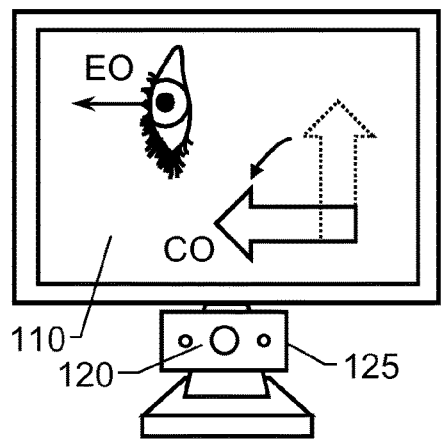
FIG. 3 show examples of how visual content may be rotated on the display unit of a stationary graphics presentation apparatus according to embodiments of the invention.

FIG. 3 shows a display unit 110 included in a stationary graphics presentation apparatus according to another embodiment of the invention. Here, instead of being integrated into the display unit 110, a separate unit 125 holds the eye-tracking module 120. Such a design is useful when upgrading a system already having screen to incorporate the invention.

The example illustrated in FIG. 3 pertains to a case essentially opposite to that in FIG. 2. Namely, in FIG. 3, the orientation EO of the at least one eye is directed horizontally to the left, and the default orientation CO of the graphics data D representing the visual content VC is directed +90° thereto, i.e. upwards. Thus, after having registered the orientation EO of the at least one eye, the data output module 1020 generates the control signal S, such that the visual content VC is rotated −90° thereto to become aligned as much as possible with the orientation EO of the at least one eye.

According to one embodiment of the invention, the data output module 1020 is configured to produce the visual content VC with an orientation CO relative to the display unit 110, which orientation CO may only be varied in predefined angular increments, say 90° per increment. Namely, this is very efficient if the display unit 110 has a typical rectangular shape. Although, of course, it is technically possible to rotate the visual content VC in other increments, this would normally be relatively complicated from a programming point-of-view, at least if the entire screen content is to be rotated.

Consequently, if for instance the visual content VC may only be rotated in orientations CO with 90-degrees increments relative to the display unit 110, any misalignment below 45 degrees, represents a minimal misalignment. In other words, as long as the misalignment between the orientation EO of the at least one eye and the orientation CO of the visual content VC is below 45 degrees a selected orientation CO will be maintained. Thus, a misalignment of 42° will not result in any change of the orientation CO.

Figure 4:
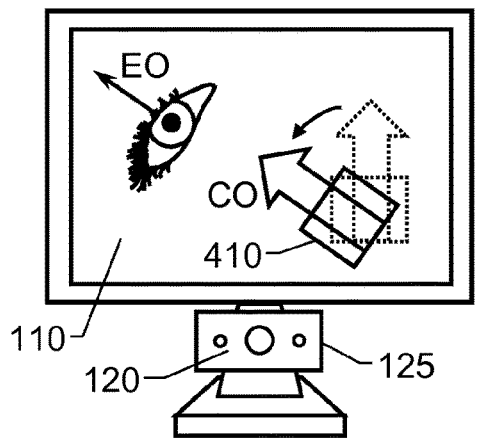
FIG. 4 show examples of how visual content may be rotated on the display unit of a stationary graphics presentation apparatus according to embodiments of the invention.

FIG. 4 shows another example of a display unit 110 included in a graphics presentation apparatus according to an embodiment of the invention, where, again, the eye-tracking module 120 is included in a unit 125 separated from the display unit 110. Here, the graphical user interface presented on the display unit 110 contains a part 410 (e.g. an on-screen window) for presenting visual content (e.g. an image or a video sequence) with an angle that is adaptively adjustable to the orientation EO of the at least one eye in increments other than 90°, e.g. continuously. This means that, if for example the eye-tracking module 120 registers an orientation EO of the at least one eye that is −50° to a vertical reference angle, the data output module 1020 produces the visual content VC so that this content also attains an angle of −50° to the vertical reference angle, and thus the misalignment between the orientation CO of the part 410 of the visual content VC and the orientation EO of the at least one eye of the user is minimized.

Figure 5:
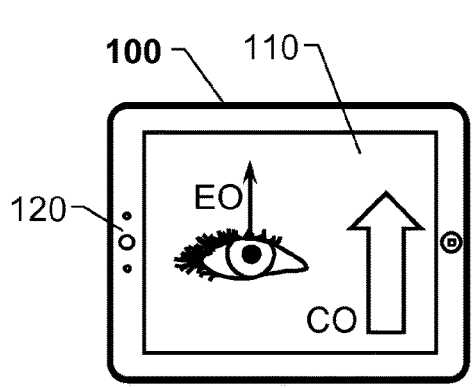
FIG. 5 exemplify how visual content may be rotated on the display unit of a portable graphics presentation apparatus according to embodiments of the invention.
Figure 6:
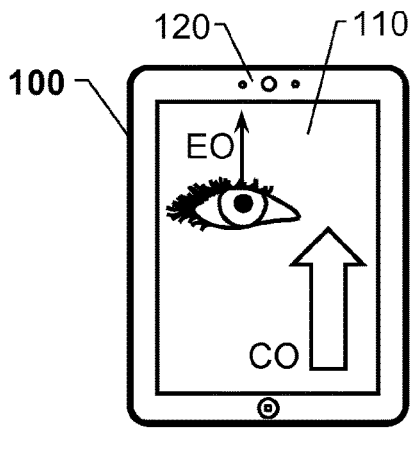
FIG. 6 exemplify how visual content may be rotated on the display unit of a portable graphics presentation apparatus according to embodiments of the invention.
Figure 7:
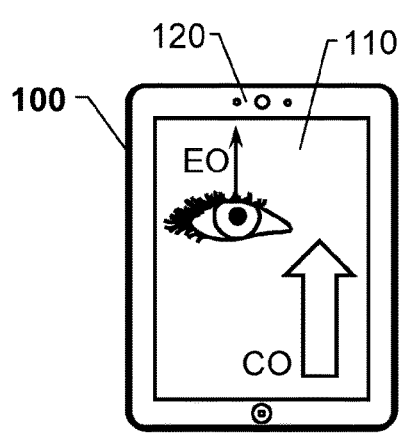
FIG. 7 exemplify how visual content may be rotated on the display unit of a portable graphics presentation apparatus according to embodiments of the invention.
Figure 8:
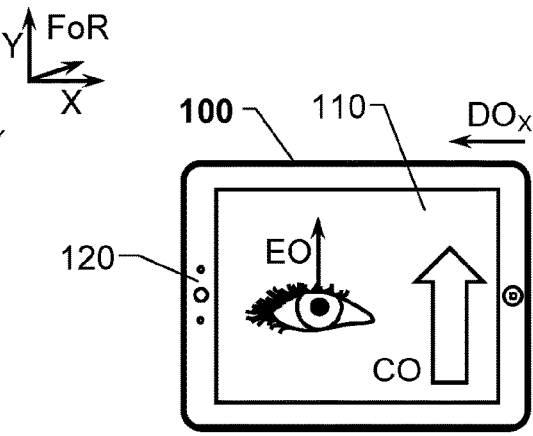
FIG. 8 exemplify how visual content may be rotated on the display unit of a portable graphics presentation apparatus according to embodiments of the invention.

FIGS. 5 and 6 show an embodiment of the invention where the graphics presentation apparatus 100 is included in a portable electronic device containing the proposed graphics presentation apparatus. Here, the eye-tracking module 120 is preferably included in a main body of the portable electronic device.

FIG. 5 illustrates a use case when a user is presumed to hold the portable electronic device with the display unit 110 in landscape mode, i.e. oriented such that the horizontal width exceeds the vertical height (for a display unit having an aspect ratio other than 1:1). Then, in FIG. 6, it is presumed that the user has rotated the portable electronic device +90° to instead be positioned in portrait mode, i.e. oriented such that the vertical height exceeds the horizontal width (for a display unit having an aspect ratio other than 1:1. Since, here, the user maintains his/her eyes orientated EO in the same direction, say upwards, while repositioning the device from the position shown in FIG. 5 to the position shown in FIG. 6, according to the invention, the eye-tracking module 120 generates the control signal S in such a manner that the data output module 1020 causes the visual content VC to be rotated −90° with respect to the display unit 110 to compensate for the rotation of the display unit 110 relative to the orientation EO of the user's eyes.

Of course, the opposite is also possible, i.e. that the user holds the portable electronic device in a fixed position, and instead changes his/her own posture relative thereto. In this case, the eye-tracking module 120 again generates the control signal S in such a manner that the data output module 1020 causes the visual content VC to be rotated with respect to the display unit 110 to compensate for relative rotation of the orientation EO of the user's eyes. In other words, according to the invention, the visual content VC always follows the orientation EO of the user's eyes regardless of how the display unit 110 as such is oriented.

Referring now to FIG. 10 again, the graphics presentation apparatus 100 may further include a rotation detection module 1010. This module is configured to register a content attitude angle αC representing an angle between the orientation CO of the visual content VC and a frame of reference FoR external to the graphics presentation apparatus. Typically, the frame of reference FoR is the Earth's field of gravity. However, other reference systems are also conceivable, such as magnetic fields. Here, the data output module 1020 is configured to produce the visual content VC in such a manner that it is presented with an orientation CO and a format that may depend on the content attitude angle αC. For example, by default the data output module 1020 may cause the orientation CO of the visual content VC to counter rotate in order to compensate for a rotation of the display unit 110 (i.e. essentially as the prior-art solutions). The graphics presentation apparatus 100 then temporarily activates eye-tracking module 120 to check if the orientation CO of the visual content VC is aligned as much as possible with the orientation EO of the user's eyes. If required, the data output module 1020 thereafter adjusts the orientation CO of the visual content VC.

Figure 9:
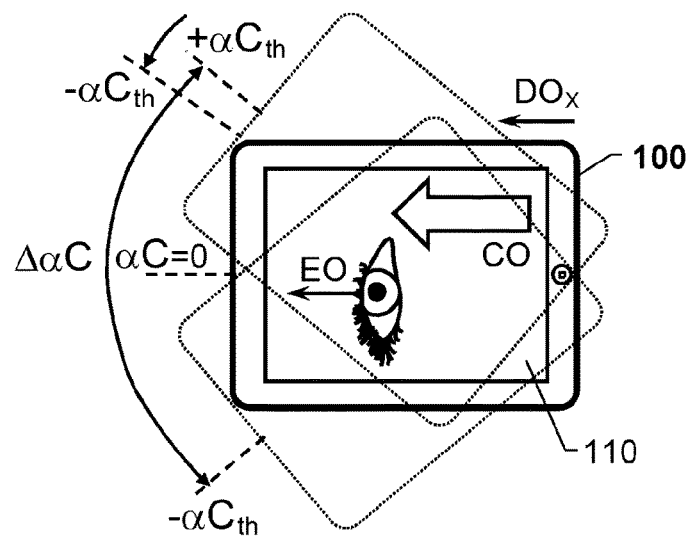
FIG. 9 exemplify how visual content may be rotated on the display unit of a portable graphics presentation apparatus according to embodiments of the invention.

Specifically, according to one embodiment of the invention illustrated with reference to FIG. 9, the rotation detection module 1010 is configured to generate a trigger signal TR if an absolute value of the content attitude angle $\alpha C$ exceeded an absolute value of a content threshold angle $\alpha C_{th}$ relative to the frame of reference FoR during a threshold time. The eye tracking module 120 is configured to be activated in response to the trigger signal TR, i.e. the eye tracking module 120 is in a passive, or de-activated, mode until it receives the trigger signal TR. Consequently, substantial amounts of energy can be saved relative to having the eye tracking module 120 continuously activated. Such economizing of the energy resources is especially important in a battery powered device, such as a portable electronic device (e.g. in the form of a laptop computer, a tablet computer, an ultrabook, an all-in-one desktop computer, or a smartphone).

Moreover, to further conserve energy, the rotation detection module 1010 is preferably configured to generate the trigger signal TR exclusively during a predetermined period after that the content threshold angle $\alpha C_{th}$ has been exceeded. Namely, during periods of a constant, or essentially constant, content attitude angle $\alpha C$ it is reasonable to expect that the angular relationship between the orientation CO of the visual content VC and the orientation EO of the at least one eye remains unchanged.

Therefore, according to one embodiment of the invention, the data output module 1020 is configured to maintain a selected orientation CO in agreement with an orientation in which the visual content VC was presented on the display unit 110 during a preceding period if the rotation detection module 1010 registers a content attitude angle $\alpha C$ having an absolute value less than or equal to the absolute value of the content threshold angle $\alpha C_{th}$. Otherwise, however, the rotation detection module 1010 sends the trigger signal TR to the eye tracking module 120, thus activating this module.

To provide a stabilizing hysteresis behavior, the content threshold angle $\alpha C_{th}$ may be set to a suitable figure. Assuming that the visual content VC can be rotated in 90 degrees increments on the display unit 110, it is advantageous to assign the absolute value of the content threshold angle $\alpha C_{th}$ a figure slightly above 45 degrees. Namely, thereby, the visual content VC will continue to have a given orientation OC also if the display unit 110 is tilted back and forth somewhat. Consequently, undesired shifting back and forth of the content orientation is avoided if the apparatus is held in an attitude angle approximately around the content threshold angle $\alpha C_{th}$. For example, a content threshold angle $\alpha C_{th}=48°$ results in 6° hysteresis.

Preferably, the graphics presentation apparatus 100 contains, or is communicatively connected to, a memory unit 1050 storing a computer program product PP, which contains software for controlling the apparatus 100 to perform the above-described actions when the computer program product PP is run on at least one processing unit of the apparatus 100.

Naturally, although FIGS. 1 to 9 show specific examples of combinations of the eye-tracking module 120 being included in a separate unit 125 or integrated into a display unit 110, (stationary or portable), angle relationships and rotation directions for the orientation CO visual content VC, according to the invention, any other combination of the eye-tracking module 120 being included in a separate unit 125 or integrated into the display unit 110, angle relationships and rotation directions for the orientation CO visual content VC is equally possible.

Figure 11:
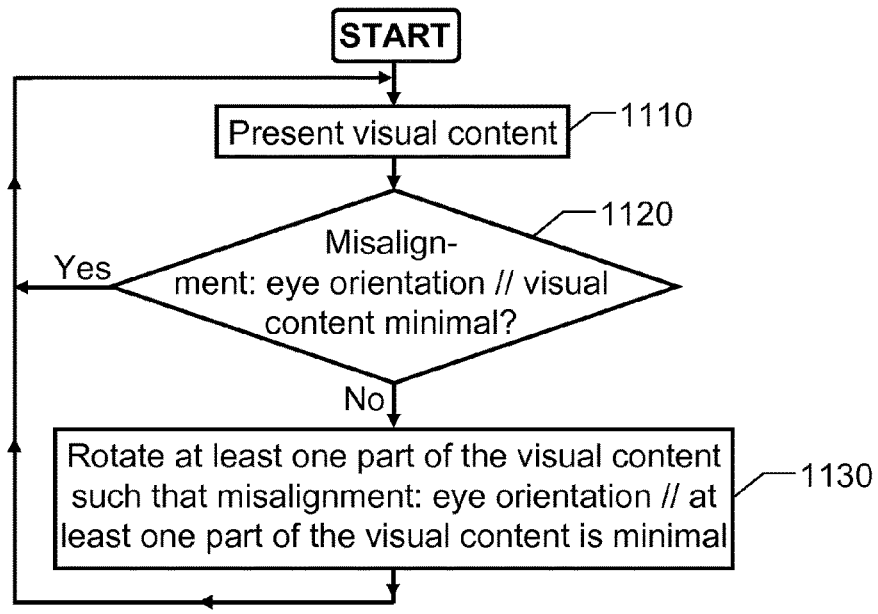
FIG. 11 illustrates, by means of a flow diagram, the general method according to the invention.

In order to sum up, we will now describe the general method according to the invention with reference to the flow diagram in FIG. 11.

In a first step 1110, visual content VC is presented on a display unit 110. In parallel there with, image data are registered representing at least one eye of a user watching the visual content VC. Based on the registered image data, a step 1120 then checks if a misalignment between the orientation EO of the at least one eye and an orientation CO of the visual content VC is minimal. In other words, step 1120 investigates if the visual content VC is aligned as much as possible with the eye orientation EO. If the misalignment between the orientations EO and CO is not minimal, a step 1130 follows. Otherwise, the procedure loops back to step 1110.

Step 1130 causes at least one part of the visual content VC to rotate relative to the display unit 110, such that the misalignment between the orientation CO of the at least one part of the visual content VC and the orientation EO of the at least one eye becomes minimal. Thereafter, the procedure loops back to step 1110.

Specifically, to effect the content rotation in step 1130, an eye tracking module 120 feeds a control signal S to a data output module 1020, which causes the data output module 1020 to produce the visual content VC with the desired orientation CO on the display unit 110.

Figure 12:
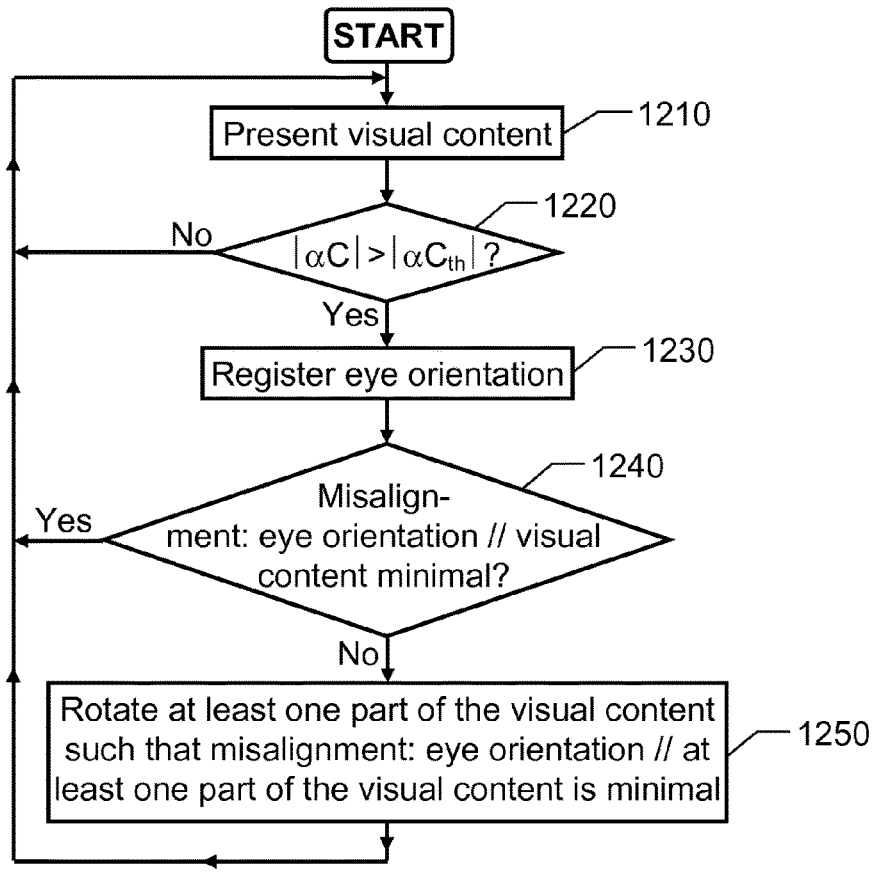
FIG. 12 illustrates, by means of a flow diagram, a method according to one embodiment of the invention.

FIG. 12 illustrates a preferred embodiment of the method according to the invention. Here, in a first step 1210, visual content VC is presented on a display unit 110. A step 1220 thereafter checks if the absolute value $|\alpha C|$ of a registered content attitude angle $\alpha C$ representing an angle between the orientation CO of the visual content VC and an external frame of reference FoR has exceeded an absolute value $|\alpha C_{th}|$ of a content threshold angle $\alpha C_{th}$ during a threshold time, and if not, the procedure loops back to step 1210 (assuming that it is not necessary to alter the orientation CO of the visual content VC).

However, if in step 1220 it is found that the absolute value $|\alpha C|$ has exceeded the absolute value $|\alpha C_{th}|$ during the threshold time, a step 1230 follows in which an orientation EO is determined of at least one eye of a user watching the visual content VC. The orientation EO is determined based on image data registered by an eye tracking module. Preferably, step 1230 involves activating the eye tracking module, which up until then preferably has been de-activated.

Subsequently, a step 1240 follows, which checks if a misalignment between the orientation EO of the at least one eye and an orientation CO of the visual content VC is minimal. If the misalignment between the orientations EO and CO is not minimal, a step 1250 follows. Otherwise, the procedure loops back to step 1210. Step 1250 causes at least one part of the visual content VC to rotate relative to the display unit 110, such that the misalignment between the orientation CO of the at least one part of the visual content VC and the orientation EO of the at least one eye becomes minimal. Thereafter, the procedure loops back to step 1210.

All of the process steps, as well as any sub-sequence of steps, described with reference to FIGS. 11 and 12 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

This application claims priority to EPO Application No. 12196926.5 dated Dec. 13, 2012; the contents of which are hereby incorporated herein by reference.

What is claimed is:

1. A graphics presentation apparatus, comprising:
a display unit configured to present visual content on a screen;
a data output module comprising computer software code stored on a computer readable medium configured to cause one or more processors to:
receive graphics data and a control signal; and
produce, in response to receiving the graphics data and the control signal, the visual content on the screen of said display unit, wherein that the visual content has a particular orientation relative to the display unit; and
an eye-tracking device configured to:
in parallel with the visual content being displayed on the screen of the display unit, register image data representing at least one eye of a user watching the visual content being displayed in the screen of the display unit;
determine, based on said image data, an orientation of the at least one eye of the user relative to the display unit, which includes a rotation of the display unit relative to the at least one eye of the user; and
generate, in response to determining an orientation, the control signal so that the control signal controls one or more processors operating the data output module to produce at least part of the visual content in a rotated orientation with respect to the display unit, wherein such rotated orientation minimizes a misalignment between the rotated orientation of the visual content and the orientation of the at least one eye of the user; and
a rotation detection module comprising computer software code stored on a computer readable medium configured to cause one or more processors to register a content attitude angle representing an angle between the orientation of the visual content and a frame of reference external to the graphics presentation apparatus;
wherein the data output module is further configured to cause one or more processors to produce the visual content in such a manner that said content is presented with an orientation and a format that depends on the content attitude angle,
wherein the rotation detection module being configured to cause one or more processors to generate a trigger signal if an absolute value of the content attitude angle has exceeded an absolute value of a content threshold angle relative to the frame of reference during a threshold time, and
wherein the eye tracking device is further configured to be activated in response to the trigger signal.

2. The graphics presentation apparatus according to claim 1, wherein the data output module is configured to cause one or more processors to produce the visual content with an orientation relative to the display unit, wherein the orientation may only be varied in predefined angular increments.

3. The graphics presentation apparatus according to claim 1, wherein the trigger signal is generated exclusively during a predetermined period after that the content threshold angle has been exceeded.

4. The graphics presentation apparatus according to claim 1, wherein the data output module is further configured to cause one or more processors to:
maintain a selected orientation in agreement with an orientation in which the visual content was presented on the display unit during a preceding period if one or more processors operating the rotation detection module registers a content attitude angle having an absolute value less than or equal to the absolute value of the content threshold angle; and
send the trigger signal to the eye tracking device.

5. The graphics presentation apparatus according to claim 4, wherein, in response to the trigger signal, the eye tracking device is further configured to generate the control signal so that one or more processors operating the data output module produces at least part of the visual content in a rotated orientation with respect to the display unit so that a misalignment between the rotated orientation and the orientation of the at least one eye of the user is minimized.

6. The graphics presentation apparatus according to claim 1, wherein the graphics presentation apparatus is included in a portable electronic device and the portable device comprises a main body relative to which the display unit has a permanently fixed orientation.

7. The graphics presentation apparatus according to claim 1, wherein the eye-tracking device comprises at least one illuminator configured to emit light towards the user of the graphics presentation apparatus.

8. A method of presenting visual content on a display unit of a graphics presentation apparatus, the method comprising:
presenting the visual content with a particular orientation relative to the display unit; and producing the visual content on the screen of said display unit in response to graphics data and a control signal, wherein producing the visual content further comprises:
  in parallel with the visual content being displayed on the screen of the display unit, registering image data representing at least one eye of a user watching the visual content being displayed in the screen of the display unit;
  determining, based on said image data, an orientation of the at least one eye of the user relative to the display unit, which includes a rotation of the display unit relative to the at least one eye of the user;
  generating, in response to determining an orientation of the at least one eye of the user relative to the display unit, the control signal so that the control signal produces at least part of the visual content in a rotated orientation with respect to the display unit, wherein such rotated orientation minimizes a misalignment between the rotated orientation of the visual content and the orientation of the at least one eye of the user;
  registering, via an eye-tracking device in the graphics presentation apparatus, a content attitude angle representing an angle between the orientation of the visual content and a frame of reference external to the graphics presentation apparatus;
  producing the visual content in such a manner that said content is presented with an orientation and a format that depends on the content attitude angle;
  generating a trigger signal if an absolute value of the content attitude angle has exceeded an absolute value of a content threshold angle relative to the frame of reference during a threshold time; and
  activating the eye tracking device in response to the trigger signal.

9. The method according to claim 8, wherein the visual content is produced with an orientation relative to the display unit, which orientation may only be varied in pre-defined angular increments.

10. The method according to claim 8, further comprising generating the trigger signal exclusively during a predetermined period after that the content threshold angle has been exceeded.

11. The method according to claim 8, further comprising:
  maintaining a selected orientation in agreement with an orientation in which the visual content was presented on the display unit during a preceding period if the absolute value of a content attitude angle is less than or equal to an absolute value of the content threshold angle; and
  sending a trigger signal to the eye tracking device.

12. The method according to claim 11, further comprising generating, in response to the trigger signal, the control signal so that at least part of the visual content is produced in a rotated orientation with respect to the display unit so that a misalignment between the rotated orientation and the orientation of the at least one eye of the user is minimized.

13. A computer program product comprising at least one non-transitory computer-readable medium having computer-readable program code portions embodied therein, the computer-readable program code portions executable to control the steps of:
  presenting a visual content with a particular orientation relative to the display unit; and
  producing the visual content on the screen of said display unit in response to graphics data and a control signal, wherein producing the visual content further comprises:
    in parallel with the visual content being displayed on the screen of the display unit, registering image data representing at least one eye of a user watching the visual content being displayed in the screen of the display unit;
    determining, based on said image data, an orientation of the at least one eye of the user relative to the display unit, which includes a rotation of the display unit relative to the at least one eye of the user;
    generating, in response to determining an orientation of the at least one eye of the user relative to the display unit, the control signal so that the control signal produces at least one part of the visual content in a rotated orientation with respect to the display unit, wherein such rotated orientation minimizes a misalignment between the rotated orientation of the visual content and the orientation of the at least one eye of the user;
    registering, via an eye-tracking device in the graphics presentation apparatus, a content attitude angle representing an angle between the orientation of the visual content and a frame of reference external to the graphics presentation apparatus;
    producing the visual content in such a manner that said content is presented with an orientation and a format that depends on the content attitude angle;
    generating a trigger signal if an absolute value of the content attitude angle has exceeded an absolute value of a content threshold angle relative to the frame of reference during a threshold time; and
    activating the eye tracking device in response to the trigger signal.

* * * * *